United States Patent [19]
Brown et al.

[11] Patent Number: 5,484,466
[45] Date of Patent: Jan. 16, 1996

[54] AIR FILTER ELEMENT WITH RADIAL SEAL SEALING GASKET

[75] Inventors: Gene W. Brown; Farrell F. Calcaterra; Daniel Sleicher, all of Kearney, Nebr.

[73] Assignee: Baldwin Filters, Inc., Kearney, Nebr.

[21] Appl. No.: 195,219

[22] Filed: Feb. 14, 1994

[51] Int. Cl.$^6$ .......................... B01D 46/02; B01D 27/08
[52] U.S. Cl. ..................... 55/498; 55/502; 55/511; 55/514; 55/521; 55/524
[58] Field of Search ........................ 55/498, 502, 507, 55/511, 514, 519, 521, 524, 525

[56] References Cited

U.S. PATENT DOCUMENTS

| | | | |
|---|---|---|---|
| 2,244,395 | 6/1941 | Hill | 55/502 |
| 2,661,078 | 12/1953 | Vance | 55/502 X |
| 3,423,909 | 1/1969 | Bennet et al. | 55/502 |
| 4,159,197 | 6/1979 | Schuler et al. | 55/502 X |
| 4,312,651 | 1/1982 | Esaki et al. | 55/502 |
| 4,322,230 | 3/1982 | Schoen et al. | 55/498 |
| 4,349,363 | 9/1982 | Patel et al. | 55/498 |
| 4,401,093 | 8/1983 | Gates et al. | 55/498 X |
| 4,634,527 | 1/1987 | Marshall | 55/502 X |
| 4,878,930 | 11/1989 | Manniso et al. | 55/498 |
| 5,030,264 | 7/1991 | Klotz et al. | 55/502 |
| 5,082,476 | 1/1992 | Kahlbaugh et al. | 55/498 X |

FOREIGN PATENT DOCUMENTS 2327522  12/1974  Germany ................. 55/498

*Primary Examiner*—Jay H. Woo
*Assistant Examiner*—Duane S. Smith
*Attorney, Agent, or Firm*—Leydig, Voit & Mayer, Ltd.

[57] ABSTRACT

An air filter element includes a media pack formed by inner and outer tubular liners and by a sleeve of filter media located between the liners. Moldable potting compound (e.g., Plastisol) is located at each end of the media pack to hold the liners and the filter media in assembled relation. A separately formed sealing gasket molded of Nitrile rubber is joined to one end of the media pack by a ring of the Plastisol, which encapsulates part of the sealing gasket. When the filter element is installed in a housing, the sealing gasket resiliently engages a sleeve and establishes a radial seal between the filter element and the sleeve. The end of the media pack opposite the sealing gasket is closed by a cap molded of the Plastisol and reinforced by a plate made of metal or stiff plastic.

11 Claims, 4 Drawing Sheets

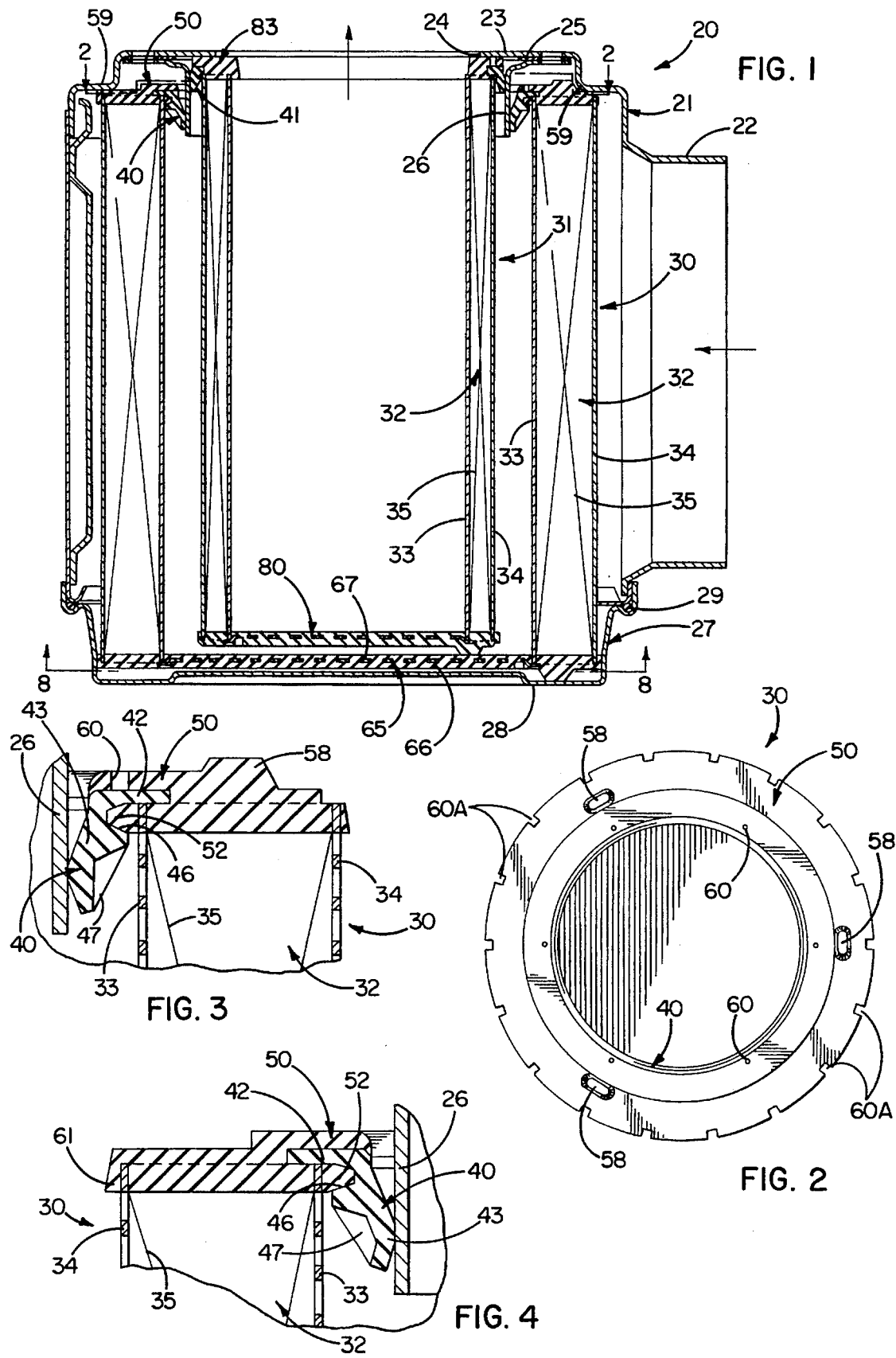

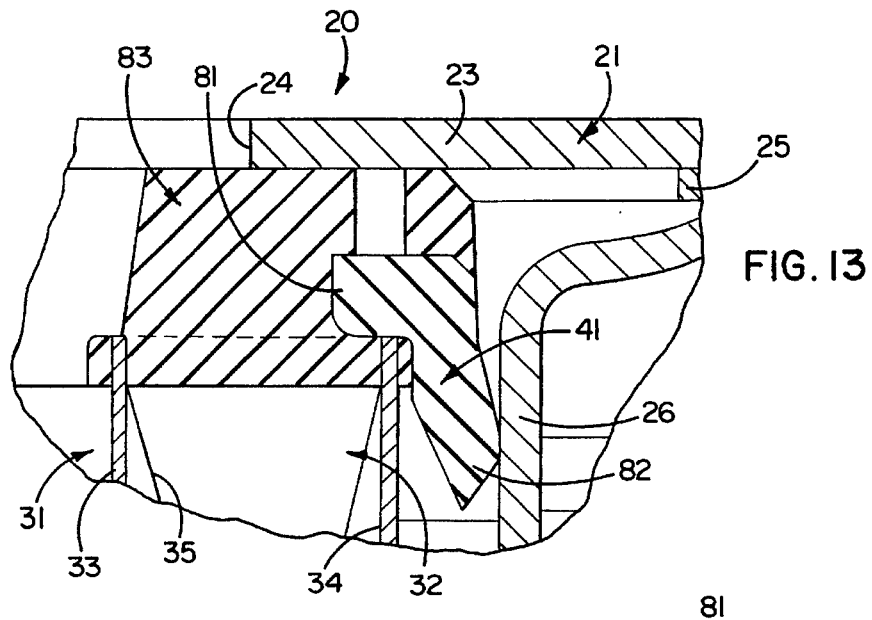
FIG. 13
FIG. 14
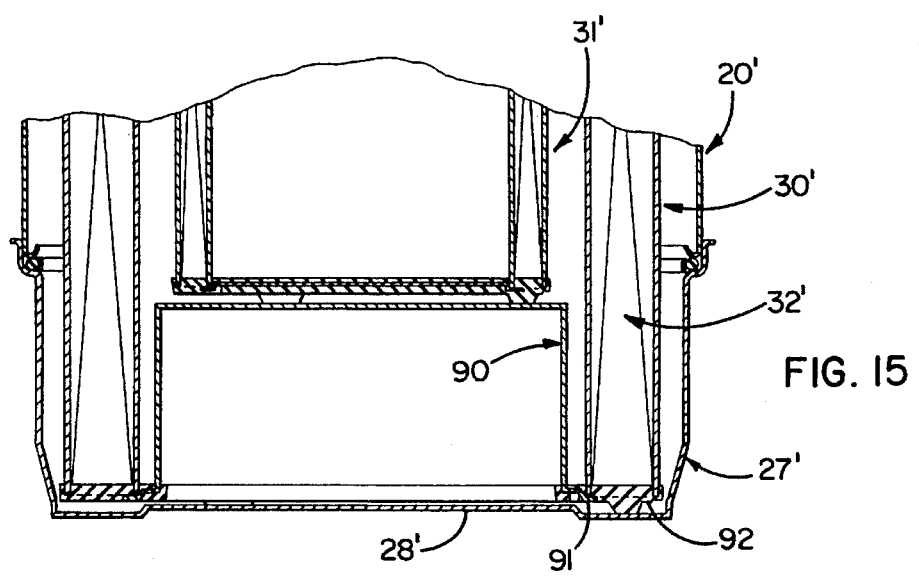
FIG. 15

5,484,466

AIR FILTER ELEMENT WITH RADIAL SEAL SEALING GASKET

BACKGROUND OF THE INVENTION

This invention relates generally to a replaceable filter element and, more particularly, to a filter element which is especially adapted for use in an air filter unit for agricultural tractors and over-the-road trucks. An air filter unit of this general type is disclosed in Engel et al U.S. Pat. No. 4,720,292.

The Engel et al filter unit comprises a sheet metal housing having an air filter element located therein. The filter element includes a sleeve of filter media (e.g., pleated paper) which is located between inner and outer liners made of perforated metal. One end of the filter element is closed by a circular cap formed by a potting compound which is molded around the end of the filter element in order to hold the inner and outer liners in assembled relation with the sleeve of filter media. In the Engel et al filter element, the potting compound which is used is a urethane foam having a relatively soft, rubber-like consistency.

Molded around the opposite end of the Engel et al filter element is a circular ring of urethane foam which coacts with the cap to hold the sleeve and the liners in assembled relation. The urethane ring also serves as a sealing element in that its inner diameter radially engages and is compressed by a tubular sheet metal air outlet member which is joined to the housing of the filter unit. The radial seal established between the urethane ring and the tubular housing member seals the filter element to the housing without need of compressing the filter element axially against the housing.

The filter element of the Engel et al patent has certain drawbacks. Because the urethane ring which holds the sleeve and liners together also serves as a sealing element, its axial dimension is relatively large. As a result, the ring encircles and closes off a relatively long section of the filter media and reduces the filtering capacity and service life thereof. A relatively large quantity of urethane is necessary and, in order to enable the ring to function as a sealing element, high performance urethane is required. Thus, the cost of providing a urethane sealing element is relatively high. Moreover, high performance urethane expands in a relatively dimensionally uncontrolled manner upon curing and causes the pleated paper filter media to separate in an uncontrolled fashion. This causes the filter element to have an unsightly appearance and can result in a relatively large number of elements being scrapped. In high temperature environments, difficulty may be encountered in maintaining an adequate radial seal even with high performance urethane because of the marginal compression set characteristics of such material.

The Engel et al filter element also is weak in the area of the circular end cap located at the end of the filter opposite the sealing ring. The urethane potting compound from which the end cap is made tends to deflect severely when subjected to relatively high pressure differentials and may rupture in operation.

SUMMARY OF THE INVENTION

The general aim of the present invention is to provide a new and improved radial seal filter element of the above general type which is capable of fitting compactly in the housing of the filter unit, which provides a large and high capacity filter media area, which may be easily installed and removed, which is of relatively low-cost construction and which is comparatively durable and trouble-free in service use.

In large, the foregoing objectives are achieved through the provision of a filter element having a media pack and having a separately formed elastomeric sealing gasket which is partially embedded in and encapsulated by a ring of moldable potting compound, preferably Plastisol, bonded to one end of the media pack. As a result of using a separate sealing gasket, the axial length of the ring of potting compound may be significantly reduced so as to leave a greater area of the media pack exposed for effective filtering of the air. Since the potting compound need not serve as the radial seal, a non-expanding compound such as Plastisol may be used to reduce separation of the pleated paper of the media pack.

A further object of the invention is to provide a filter element having a reinforced end cap capable of withstanding higher pressure differentials without rupturing.

The invention also resides in the provision of a filter element in which a relatively inexpensive sheet metal pedestal is molded into the end cap and serves to support a secondary filter element within the primary element.

These and other objects and advantages of the invention will become more apparent from the following detailed description when taken in conjunction with the accompanying drawings.

BRIEF DESCRIPTION OF THE DRAWINGS

FIG. 1 is a cross-sectional view taken axially through an air filter unit equipped with two new and improved air filter elements incorporating the unique features of the present invention.

FIG. 2 is a cross-sectional view, on a reduced scale, taken substantially along the line 2—2 of FIG. 1.

FIGS. 3 and 4 are enlarged views of certain components of the air filter unit illustrated in FIG. 1 and show the elastomeric sealing gasket of one of the filter elements.

FIG. 13 is an enlarged view generally similar to FIG. 3 but shows the elastomeric sealing gasket of the other filter element of the air filter unit.

FIG. 14 is an enlarged view showing the sealing gasket of FIG. 13 prior to installation of the air filter element.

FIG. 15 is a fragmentary view generally similar to FIG. 1 but shows a modified version of an air filter unit.

Figure 5:
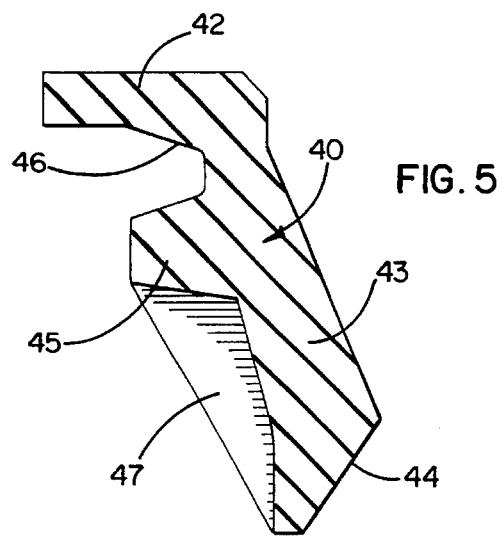
FIG. 5 is an enlarged view showing the elastomeric sealing gasket of FIGS. 3 and 4 prior to installation of the air filter element.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in the drawings as incorporated in an air filter unit 20 which is especially adapted for use with the engines of over-the-road trucks and agricultural vehicles. The air filter unit includes an outer shell 21 having a tubular inlet 22 for admitting unfiltered air into the unit. The shell also includes a top wall 23 having a centrally located outlet opening 24 for discharging filtered air to the intake of the engine. For a purpose to be described subsequently, a plate 25 underlies and is secured to the top wall 24 and is formed with a centrally positioned sleeve 26 which extends downwardly a short distance into the shell 21.

Closing the bottom of the shell 21 is a selectively removable dish-shaped cover 27 having a bottom wall 28. The cover is sealed to the lower end of the shell by an O-ring 29 and may be pulled away from the lower end of the shell to permit access to the interior of the shell.

In this particular instance, the air filter unit 20 includes two coaxial filter elements 30 and 31 disposed within the shell 21 and the cover 27, although in many cases only a single filter element may be employed. The filter element 30 is an outer filter element which effects primary filtering of the air entering the inlet 22. Thereafter, the air passes through the inner filter element 31 for final filtering of fine particles before being discharged through the outlet opening 24 to the engine.

Each filter element 30 and 31 includes a so-called media pack 32. Herein, each media pack is essentially of conventional construction and comprises inner and outer radially spaced and coaxial tubular liners 33 and 34 and further comprises a tube of filter media 35 located between and coaxial with the liners. Typically, the liners 33 and 34 are made of expanded or perforated metal while the filter media 35 is a sleeve of pleated paper. The inner liner sometimes is referred to as a center tube.

It is necessary to establish a seal between the shell 21 and each filter element 30 and 31 to insure that the incoming air passes through the filter media 35 before being discharged through the outlet 24. In accordance with the present invention, the filter elements 30 and 31 are radially sealed to the sleeve 26 of the shell by elastomeric gaskets 40 and 41, respectively, which are formed separately from and are subsequently attached to the media packs 32 of the filter elements. As will become apparent subsequently, several advantages are obtained through the use of the separately formed sealing gaskets 40 and 41.

The sealing gasket 40 for the outer filter element 30 will be described first. It preferably is injection molded of a rubber-like material known as Nitrile rubber. The gasket is in the form of a ring having an upper radially extending mounting portion or flange 42 (FIG. 5) and having a sealing portion 43 integral with and depending from the lower, inner margin of the mounting flange. The sealing portion 43 of the gasket 40 is inclined so as to slope inwardly upon progressing downwardly from the mounting flange 42. Prior to installation of the filter element 30 into the shell 21, the sealing portion 43 is in a relaxed condition as shown in FIG. 5 and its lower section includes a reversely angled inner surface 44. A rib 45 is formed integrally with and projects outwardly from the sealing portion 43 near the upper end thereof and is spaced below the mounting flange 42. The upper side of the rib and the lower side of the mounting flange 42 coact to define a radially outwardly opening groove 46 which extends circumferentially around the gasket 40. Several webs 47 are spaced angularly around the outer side of the sealing portion 43 and extend downwardly from the underside of the rib 45 to the lower end of the sealing section.

In carrying out the invention, the sealing gasket 40 is joined to the media pack 32 of the filter element 30 by a ring 50 (FIGS. 2–4) of moldable potting compound (e.g., Plastisol) which causes the separately formed gasket to become an intimate part of the media pack. When the sealing gasket is so joined to the media pack, its sealing section 43 seals radially against the outer side of the sleeve 26 upon installation of the filter element 30 into the shell 21.

Figure 9:
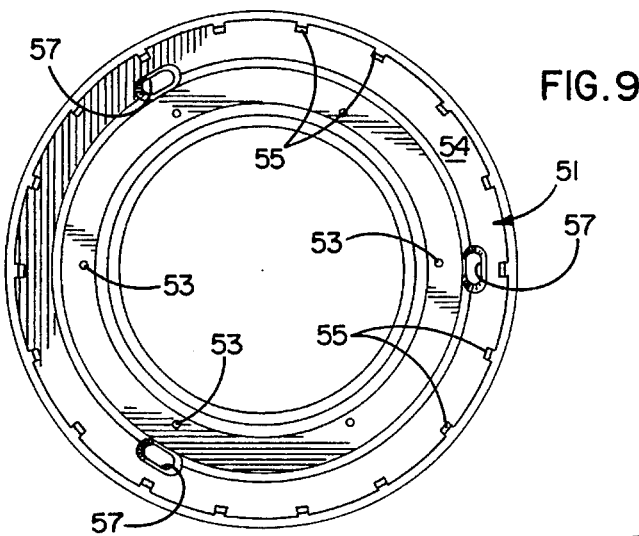
FIG. 9 is a top plan view of a mold for forming the upper end portion of one of the filter elements.
Figure 10:
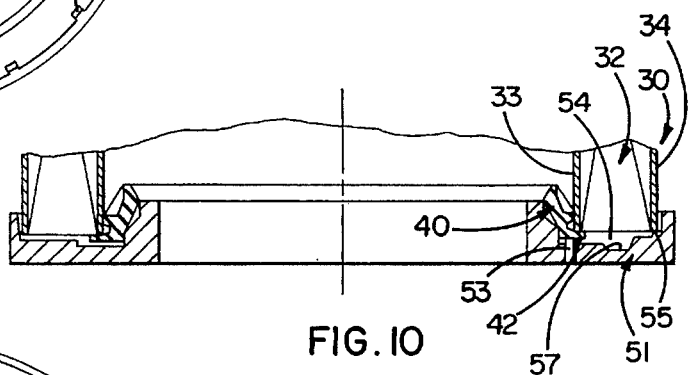
FIG. 10 is a cross-sectional view showing the upper end portion of a filter element in position to be formed in the mold of FIG. 9.
Figure 11:
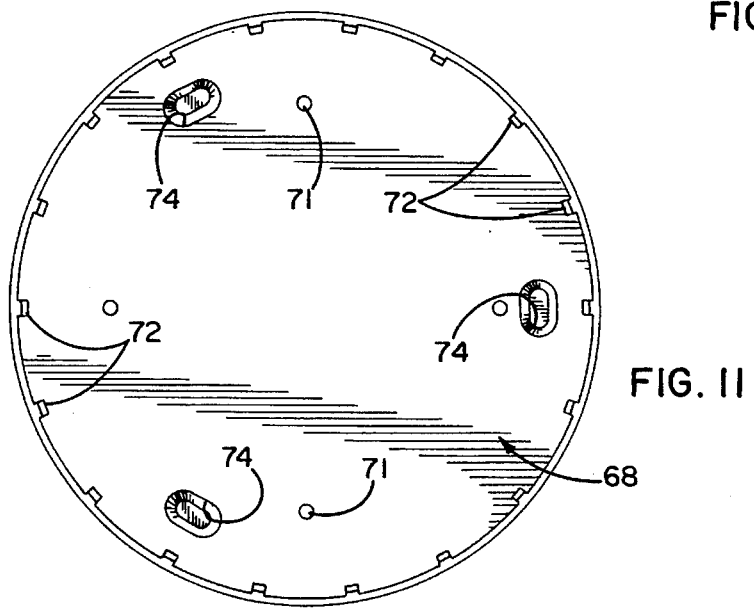
FIG. 11 is a top plan view of a mold for forming the lower end portion of one of the filter elements.

Herein, joining of the gasket 40 to the media pack 32 of the filter element 30 is effected by placing the gasket in a heated mold 51 (FIGS. 9 and 10). Thereafter, the media pack 32 is placed in the mold 51 in the position shown in FIG. 10. The mold is formed with six angularly spaced pins 53 (FIGS. 9 and 10) which project upwardly from the mold and which engage the mounting flange 42 of the gasket to space the mounting flange upwardly from the bottom of an annular molding cavity 54. In addition, the mold is formed with several angularly spaced and raised tabs 55 which engage the outer liner 34 of the media pack 32 to hold the outer diameter of the media pack upwardly from the bottom of the mold cavity. The inner liner 33 of the media pack is held in upwardly spaced relation with the bottom of the mold cavity by virtue of resting on the mounting flange 42 of the gasket.

Figure 6:
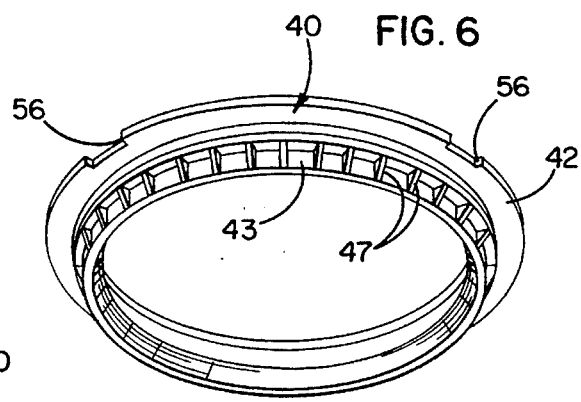
FIG. 6 is a perspective view of the sealing gasket of FIGS. 3–5.

After the gasket 40 and the media pack 32 have been located in the mold 51 as shown in FIG. 10, the mold cavity 54 is filled with Plastisol potting compound in order to form the ring 50. When the potting compound cures, the ring 50 becomes intimately bonded to the end portion of the media pack and, in addition, bonds against the mounting flange 42 of the gasket 40 in order to permanently join the gasket to the media pack (see FIGS. 3 and 4). To enhance the connection of the gasket 40 to the ring 50, the outer periphery of the mounting flange 42 of the gasket is formed with angularly spaced notches 56 (FIG. 6) which become filled with potting compound when the latter is poured into the cavity 54. In addition, potting compound flows into the groove 46 of the gasket and forms a rib 52 (FIG. 3) which helps lock the gasket and the potting compound together.

The bottom of the mold cavity 54 is formed with three angularly spaced pockets 57 (FIG. 9) which cause raised bumpers 58 (FIGS. 2 and 3) to be formed on the upper side of the ring 50. In certain air filter units, the bumpers engage the top wall of the shell to establish a stand-off between the top wall and the media pack. In the particular filter unit 20 which has been shown, the outer periphery of the ring 50 engages a bend 59 (FIG. 1) in the top wall 23 to establish the position of the filter element 30 in the shell 21.

FIG. 3 shows the upper end portion of the media pack 32 of the filter element 30 in an angular area corresponding to that of a mold pin 53. It will be noted that the pin causes a small-diameter hole 60 to be formed through the ring 50. In addition, the tabs 55 of the mold cause angularly spaced notches 60A (FIG. 2) to be left in the outer periphery of the ring 50. FIG. 4 shows one of the angular areas of the ring 50 corresponding to a space between adjacent tabs 55 of the mold 51. In each such area, the ring includes a lip 61 which extends downwardly a short distance around the outer side of the outer liner 34 of the media pack 32.

The filter element 30 is installed in the shell 21 by removing the cover 27 and by telescoping the element upwardly into the shell. As an incident thereto, the sealing portion 43 of the gasket 40 engages the outer diameter of the sleeve 26, is deflected thereby, and is flexed into radial sealing engagement with the sleeve as shown in FIGS. 3 and 4. As is apparent from those views, the axial length of the Plastisol ring 50 is kept relatively small since the ring itself does not seal against the sleeve 26. Also, the sealing portion 43 of the gasket is spaced radially from the inner liner 33 of the media pack 32. As a result of the short ring 50 and the radially spaced sealing portion 43, only a relatively short length of the filter media 35 is encumbered and incapable of performing a filtering function. Accordingly, a media pack of a given length has a relatively large percentage of that length exposed and thus the media pack has comparatively high filtering capacity.

Because the sealing function is performed by the Nitrile gasket 40 rather than by potting compound, a rather inexpensive and non-expanding potting compound such as Plastisol may be used in lieu of high performance urethane. The non-expanding nature of the Plastisol minimizes separation of the pleats of the filter media 35. When compared to urethane, the Nitrile gasket enables a better radial seal to be maintained under high temperature conditions.

When the filter element 30 is pulled out of the shell 21, the webs 47 prevent the sealing portion 43 from rolling upwardly and causing separation of the gasket from the ring 50. Thus, the filter element 30 may be removed and cleaned and then may be re-installed.

Figure 7:
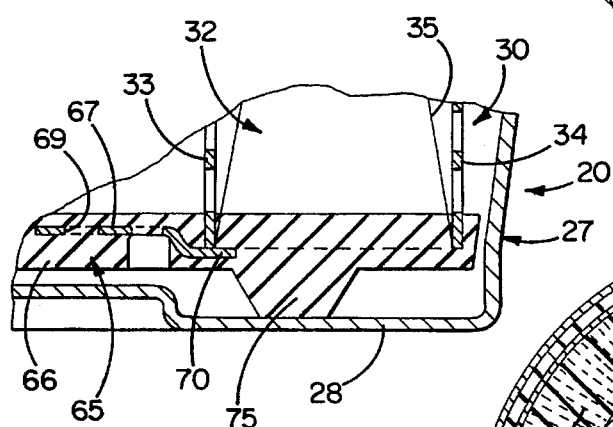
FIG. 7 is another enlarged view of certain components of the air filter unit shown in FIG. 1.
Figure 8:
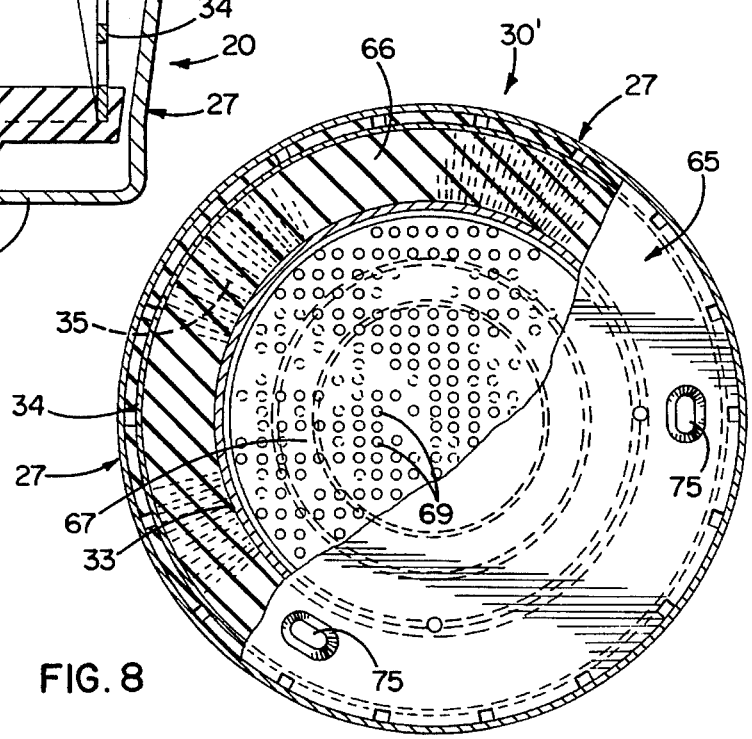
FIG. 8 is a cross-section taken substantially along the line 8—8 of FIG. 1.

The invention also contemplates providing the lower end portion of the filter element 30 with a reinforced end cap 65 which resists deflection and rupture when exposed to high differential pressure. Herein, the end cap comprises a disc 66 (FIG. 7) of Plastisol potting compound and a metal or stiff plastic reinforcement plate 67 which is embedded in and encapsulated by the disc.

The nature of the end cap 65 may best be explained by reference to FIGS. 7 and 8 and FIGS. 11 and 12, the latter two views showing a mold 68 for forming the end cap. The plate 67 is circular, is perforated so as to be formed with several holes 69, and is formed with an outwardly extending peripheral flange 70 which is spaced downwardly from the main body of the plate. The plate 67 is placed in the mold 68 and is held in upwardly spaced relation from the bottom of the mold by virtue of the main body of the plate resting on four angularly spaced pins 71 projecting upwardly from the mold (see FIG. 12). The lower end portion of the media pack 32 of the filter element 30 then is placed in the mold 68 and, when so placed, its inner diameter rests on the flange 70 of the plate. The outer diameter of the media pack rests on several angularly spaced pads 72 projecting upwardly from the mold. As a result, a mold cavity 73 is formed beneath the media pack and the plate, the cavity having three angularly spaced pockets 74 (FIG. 11) for forming downwardly projecting bumpers 75 (FIGS. 7 and 8) on the disc 66 of the end cap 65.

Figure 12:
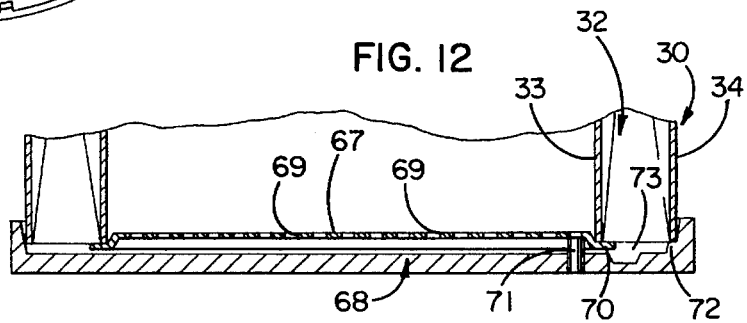
FIG. 12 is a cross-sectional view showing the lower end portion of a filter element in position to be formed by the mold of FIG. 11.

After the plate 67 and the media pack 32 have been placed in the mold 68 as shown in FIG. 12, Plastisol is poured into the mold, fills the cavity 73 and rises to a level above the plate. As a result, the disc 66 is formed and encapsulates the plate 67 and the end portion of the media pack. The holes 69 in the plate become filled with Plastisol to help lock the plate to the disc. By virtue of the reinforcing plate, the end cap 65 is strengthened significantly and has greater resistance to flexure and rupture when subjected to high pressure differentials. Also, the bumpers 75 engage the bottom wall 28 of the cover 27 when the latter is installed (see FIG. 7) and cause the ring 50 to be pressed upwardly against the shell 21 so as to prevent rattling of the filter element 30.

The inner filter element 31 includes an end cap 80 (FIG. 1) which is essentially identical to the end cap 65 and which thus need not be described in detail. The separate Nitrile rubber gasket 41 of the inner filter element 31 includes a mounting flange 81 (FIGS. 13 and 14) and a sealing portion 82, the latter flaring outwardly and being adapted to seal radially against the inner diameter of the sleeve 26. The sealing gasket 41 is joined to the end portion of the media pack 32 of the inner filter element 31 by a Plastisol ring 83 (FIG. 13) which is molded much in the manner as the ring 50 but in a somewhat differently configured mold (not shown). It will be noted that the sealing portion 82 of the gasket 41 diverges away from the outer liner 34 of the inner filter element 31 upon progressing downwardly whereas the sealing portion 43 of the gasket 40 diverges away from the inner liner 33 of the outer filter element 30 upon progressing downwardly.

A modified filter unit 20' is shown in FIG. 15 in which parts corresponding to those of the first embodiment are indicated by the same but primed reference numerals. In the filter unit 20', the inner filter element 31' is significantly shorter than the outer filter element 30' and is spaced a substantial distance above the bottom wall 28' of the cover 27'.

To hold the inner filter element 31' in upwardly spaced relation from the bottom wall 28' of the cover 27', a sheet metal pedestal 90 is located in the outer filter element 30' and defines a platform for supporting the inner filter element. The outer periphery of the lower end of the pedestal is formed with a flange 91 similar to the flange 70 and embedded in and encapsulated by the potting compound of a lower ring 92 of the outer filter element. The pedestal 90 and the ring 92 coact to close off the lower end of the media pack 32' of the outer filter element 30' and thus serve as an end cap. The use of a sheet metal pedestal rather than a plastic pedestal reduces the cost of the pedestal construction due to the fact that the sheet metal may be thinner than plastic and enables the use of high speed production techniques.

We claim:

1. A filter element comprising a tubular media pack having first and second ends said media pack comprising inner and outer radially spaced and coaxial tubular liners each having inner and outer sides and having first and second ends, a tube of filter media located between and coaxial with said liners, a separate preformed annular basket made of elastomeric material having a mounting port ion and an integral sealing portion, said gasket being located with said mounting portion abutting the first end of one of the liners and with said sealing portion extending along one side of said one liner, and a ring of moldable potting compound encapsulating at least a part of said mounting portion of said gasket and a portion of the first end of said one liner, to thereby secure the mounting portion of the gasket to the first end of said media pack.

2. A filter element as defined in claim 1 in which said sealing portion of said gasket is inclined so as to diverge away from said one side of said one liner upon progressing away from said first end of said media pack.

3. A filter element as defined in claim 1 in which said gasket is formed with a circumferentially extending and radially opening groove, a portion of said ring projecting radially into said groove to help retain said gasket on said first end of said media pack.

4. A filter element as defined in claim 1 in which said sealing portion of said gasket is inclined so as to diverge away from said one side of said one liner upon progressing away from said ring.

5. A filter element as defined in claim 4 in which said ring includes inner and outer peripheries, said mounting portion of said gasket extending generally radially of the inner periphery of said ring, and said sealing portion of said gasket extending generally axially from said ring adjacent the inner side of said inner liner.

6. A filter element as defined in claim 4 in which said ring includes inner and outer peripheries, said mounting portion of said gasket extending generally radially of the outer periphery of said ring, and said sealing portion of said gasket extending generally axially from said ring adjacent the outer side of said outer liner.

7. A filter element as defined in claim 1 further including a cap of moldable potting compound bonded to and closing the second end of said media pack, said cap having first and second ends, and a reinforcement plate embedded in and encapsulated by the potting compound of said cap between the first and second ends of the cap.

8. A filter element as defined in claim 7 in which said reinforcement plate is formed with a series of holes which are filled with the potting compound of said cap to anchor said plate to such potting compound.

9. A filter element as defined in claim 1 further including a second ring of moldable potting compound at said second end of said media pack, a pedestal made of sheet metal and located within said media pack adjacent the second end portion thereof, said pedestal having a flange embedded in and encapsulated by the potting compound of said second ring.

10. A filter element as defined in claim 9 in which said pedestal and said second ring coact to close off said second end of said media pack.

11. An air filter element comprising inner and outer radially spaced and coaxial tubular liners each having inner and outer sides and further comprising tubular filter media located between said liners, said filter element having first and second ends, a disc of moldable potting compound encapsulating said liners and said filter media at the second end of said filter element, a ring of moldable potting compound encapsulating said liners and said filter media at the first end of said filter element, said disc and said ring coacting to hold said liners and said filter media in assembled relation, a preformed annular gasket made of elastomeric material and having a mounting portion encapsulated by said ring and engaging one of said liners, said gasket having a sealing portion formed integrally with said mounting portion, said sealing portion extending from said ring and toward said disc adjacent one side of one of said liners and being inclined so as to diverge away from said one side upon progressing from said ring and toward said disc.

* * * * *